United States Patent [19]

Hiscock et al.

[11] Patent Number: 4,589,888

[45] Date of Patent: May 20, 1986

[54] PRESSURE SWING ADSORPTION PROCESS

[75] Inventors: Willis E. Hiscock, Norwalk, Conn.; Robert T. Cassidy, Waldwick, N.J.; Robert G. Werner, Danbury, Conn.

[73] Assignee: Union Carbide Corporation, Danbury, Conn.

[21] Appl. No.: 658,306

[22] Filed: Oct. 5, 1984

[51] Int. Cl.$^4$ .............................................. B01D 53/04
[52] U.S. Cl. .............................................. 55/26; 55/62; 55/68; 55/75
[58] Field of Search .................... 55/25, 26, 58, 62, 75, 55/161–163, 179, 389

[56] References Cited

U.S. PATENT DOCUMENTS

| | | | |
|---|---|---|---|
| 3,430,418 | 3/1969 | Wagner | 55/25 |
| 3,564,816 | 2/1971 | Batta | 55/26 |
| 3,738,087 | 6/1973 | McCombs | 55/58 |
| 3,986,849 | 10/1976 | Fuderer et al. | 55/25 |
| 4,077,780 | 3/1978 | Dashi | 55/26 |
| 4,333,744 | 6/1982 | Fuderer | 55/25 |
| 4,340,398 | 7/1982 | Dashi et al. | 55/25 |
| 4,381,189 | 4/1983 | Fuderer | 55/26 |
| 4,398,926 | 8/1983 | Dashi | 55/25 X |
| 4,406,675 | 9/1983 | Dangieri et al. | 55/26 |
| 4,461,630 | 7/1984 | Cassidy et al. | 55/25 |
| 4,468,237 | 8/1984 | Fuderer | 55/26 |
| 4,482,361 | 11/1984 | Whysall | 55/26 |

FOREIGN PATENT DOCUMENTS 43179   4/1979   Japan .................... 55/26

*Primary Examiner*—Robert Spitzer
*Attorney, Agent, or Firm*—A. H. Fritschler

[57] ABSTRACT

In air separation and other gas separations employing pressure swing adsorption technology, reduced cycle times are achieved by an advantageous combination of simultaneous processing steps. The gas released upon cocurrent depressurization from higher adsorption pressure is employed simultaneously for pressure equalization and provide purge purposes. Cocurrent depressurization is also carried out at an intermediate pressure level, while countercurrent depressurization is simultaneously carried out at the opposite end of the bed being depressurized to its lower desorption pressure level.

26 Claims, No Drawings

PRESSURE SWING ADSORPTION PROCESS

BACKGROUND OF THE INVENTION

1. Field of the Invention

The invention relates to the purification of gases in a pressure swing adsorption system. More particularly, it relates to improvements in the processing cycle and system enabling improved performance to be achieved.

2. Description of the Prior Art

The pressure swing adsorption (PSA) process provides a commercially desirable technique for separating and purifying at least one component of a feed gas mixture containing said component and at least one selectively adsorbable component. Adsorption occurs in an adsorbent bed at a higher adsorption pressure, with the selectively adsorbable component thereafter being desorbed by reducing the adsorbent bed pressure to a lower desorption pressure. The carrying out of the PSA process in multi-bed systems is illustrated by the Wagner patent, U.S. Pat. No. 3,430,418, relating to a system having at least four beds. As is generally known and described in this patent, the PSA process is commonly carried out, on a cyclic, in a processing sequence that includes, in each bed, (1) higher pressure adsorption with release of product effluent from the product end of the bed, (2) cocurrent depressurization to intermediate pressure with release of void space gas from the product end thereof, (3) countercurrent depressurization to a lower desorption pressure, (4) purge and (5) repressurization. The void space gas released during the cocurrent depressurization step is commonly employed for pressure equalization purposes and to provide purge gas to a bed at its lower desorption pressure.

In a variation of said PSA processing described above with reference to systems having four or more absorbent beds, a conventional three bed system was devised for use in the separation and recovery of air and other such separations. This system was based on the increasing pressure adsorption step described in the McCombs patent, U.S. Pat. No. 3,738,087. In one embodiment thereof, air is added to an adsorbent bed for the repressurization thereof, with nitrogen being selectively adsorbed and with oxygen being discharged from the product end of the bed at rates such that the bed pressure increases to upper adsorption pressure. A PSA cycle incorporating said increasing pressure adsorption step includes (1) said increasing pressure adsorption step, (2) cocurrent depressurization to intermediate pressure with release of void space gas from the product end thereof, (3) countercurrent depressurization to a lower desorption pressure, (4) purge and (5) partial repressurization. The void space gas released during the cocurrent depressurization step is employed, in this embodiment, for passage to other beds in the system in a pressure equalization-provide purge - pressure equalization sequence. This latter cycle makes unnecessary a constant pressure adsorption step as employed in the Wagner cycle. This enables more time for bed regeneration, i.e. countercurrent depressurization and purge, within a given cycle time so as to enable greater productivity and recovery and/or purity to be obtained from a given system, particularly in systems designed for relatively short overall cycle time operation.

Using such a three bed system with each bed containing commercial 13X, 8×12 bead form, molecular sieve in air separation operations, an oxygen recovery of 48% and a productivity (BSF) of 4,000 lb. 13 X molecular sieve per one ton per day (TPD) of oxygen have been obtained. Said recovery is defined as the percent or volume fraction of the feed air oxygen removed from the feed stream and delivered as oxygen product. Productivity is defined as the pounds of molecular sieve required to generate 1 TPD of contained oxygen. The recovery and productivity values referred to above were obtained on the basis of a 180 second total cycle time for the 3-bed PSA system, with feed air being introduced at a maximum pressure of 40 psig, with product being discharged at 20 psig.

While such standard 3-bed system is desirable for various commercial applications, there is, nevertheless, a desire in the art to improve product recovery and productivity. Difficulties have been encountered, however, in achieving such objectives. Thus, the total cycle time had to be reduced to less than said 180 seconds to yield a significant BSF reduction (productivity increase) compared to said standard 3-bed operation. However, reductions in individual step times, i.e. the purge and pressure equalization steps, are limited by gas velocity and bed fluidization limits, or by applicable cycle performance standards. Such limitations prevent the achieving of substantial cycle time reductions only by means of reductions in the duration of the individual cycle steps. With respect to the standard 4-bed system, on the other hand, the addition of a fifth adsorbent bed to increase single bed capacity limits by means of standard cycling techniques applicable to said systems would necessarily result in an increase in total cycle times and in the BSF values for any given application. Such an increase in BSF value would compromise any potential increase in productive capacity derived from an increase in the number of vessels employed in the PSA system. In addition, size limitations on PSA-oxygen adsorbent beds limit the maximum capacity of a single PSA train, so that the development of means to reduce the BSF would be required to increase the maximum capacity limits of such a single PSA train. There remains in the art, therefore, a need to develop improvements in the PSA art enabling reductions in BSF and increased single train capacity to be achieved. Such improvements advantageously would enable the overall cycle time to be reduced, while enabling sufficient time to complete each individual cycle time without degradation of product purity or recovery.

It is an object of the invention, therefore, to provide an improved PSA process and system.

It is another object of the invention to provide a PSA process and system for the enhanced separation and recovery of oxygen from air.

It is another object of the invention to provide a PSA process and system enabling overall cycle times to be minimized while enabling sufficient time to complete each individual cycle step without degradation in product purity or recovery.

With these and other objects in mind, the invention is hereinafter described in detail, the novel features thereof being particularly pointed out in the appended claims.

SUMMARY OF THE INVENTION

The PSA Process and system of the invention advantageously employs novel simultaneous cycle steps that enable the total cycle time to be reduced, product recovery to be enhanced, and BSF reductions to be achieved. The time required for the separate provide purge step is desirably shorter than the purge step, with the overall countercurrent depressurization and purge time enabling adequate bed regeneration to be accomplished with the overall shorter total cycle times permissible in the practice of the invention.

DETAILED DESCRIPTION OF THE INVENTION

The objects of the invention are accomplished by the incorporation into the PSA process and system as described above with reference to the Wagner patent of the invention can be used in a variety of processing cycles such as, for example, those involving five or more beds with two beds on adsorption at any given time, in overlapping sequence, during the overall PSA processing cycle. Those skilled in the art will appreciate that various other PSA processes and systems can be adapted so as to take advantage of the desirable benefits of the invention in desirable PSA cycles The practice of the invention can be illustrated by Table I below with respect to a four bed embodiment of the invention:

TABLE I

| Bed No. | Cycle (412) E1/pp, E2/BD |
|---|---|
| 1 | A \| E1/PP \| PP \| E2/BD \| P \| E2 \| E1 \| R |
| 2 | E1 \| R \| A \| E1/PP \| PP \| E2/BD \| P \| E2 |
| 3 | P \| E2 \| E1 \| R \| A \| E1/PP \| PP \| E2/BD |
| 4 | E1/PP \| PP \| E2/BD \| P \| E2 \| E1 \| R \| A | simultaneous cycle steps relating to the cocurrent depressurization and the countercurrent depressurization portions of the overall cycle. Such simultaneous steps enable the total cycle time to be reduced and BSF reductions, i.e. increased adsorbent productivity, to be obtained. Enhanced bed capacity can be achieved in the practice of the invention at minimized overall cycle times without degradation of product effluent purity or recovery. The invention has been found to actually result in significant improvements in product recovery as compared with the standard commercial 3-bed PSA process and system referred to above.

It should be noted that the invention, in a desirable embodiment, is based upon the use of a constant adsorption pressure step, as in the Wagner cycle referred to above, wherein feed gas is passed to an adsorption bed maintained at an upper adsorption pressure level, with the more readily adsorbable component being selectively adsorbed and with the less readily adsorbable component being discharged from the product end of the bed as product effluent. Such constant adsorption pressure cycles, modified in accordance with the invention, enable lower BSF requirements to be achieved, which result in higher single train capacities and lower adsorbent inventory requirements for a given product capacity and purity. The following description of the invention will be understood, therefore, to represent a desirable modification of the overall processing cycle of Wagner as recited above.

The invention can advantageously be employed in multi-bed PSA systems having at least four adsorbent beds therein, with systems containing four beds being highly desirable for some applications. Five, six or seven adsorbent bed systems are also desirable in some instances. While the invention can be practiced in systems having 8 or more beds, it is commonly expedient to employ two 4-bed systems, or the like, as an alternative to such higher number of beds in a single system. It will be understood that, in such multi-bed systems, the feed gas may be passed to more than one bed at any particular stage of the processing cycle. Thus, the feed gas is often passed to at least two beds at any given time in the operation of such multi-bed systems. As with respect to conventional practice, the PSA process desirably employs two, three or more pressure equalization steps in which cocurrent depressurization gas released from one bed at an elevated pressure is used to partially repressurize another bed initially at lower pressure and to provide purge to a bed at lower desorption pressure. Thus, In this Table with respect to each bed, A represents an adsorption step at an upper adsorption pressure with discharge of the less readily adsorbable component as product effluent from the product end of the bed; PP represents a cocurrent depressurization step in which void space gas is released from the product end of the bed for use in providing purge gas to another bed typically at its lower desorption pressure, said bed being depressurized from an upper intermediate pressure to an intermediate pressure level; P represents a purge step typically at lower desorption pressure in which void space gas released from another bed is passed directly to said bed undergoing its purge step, with said purge step being seen to be of longer duration than the provide purge step PP; R represents repressurization to upper adsorption pressure; E1/PP represents one of the novel steps of the invention, namely a cocurrent depressurization step in which void space gas released during cocurrent depressurization from said upper adsorption pressure to an upper intermediate pressure is passed simultaneously to one other bed in the system being partially repressurized to said upper intermediate pressure and to a second other bed as purge gas for said bed at its lower desorption pressure level; and E2/BD represents the other novel step wherein further cocurrent depressurization from said intermediate pressure level to a lower intermediate pressure is carried out with release of additional void space gas from the product end of the bed, said void space gas being passed to another bed in the system for pressure equalization therebetween at said lower intermediate pressure, while the bed is being simultaneously depressurized countercurrently by the discharge of gas from the feed end of the bed. The countercurrent, or BD, portion of said E2-BD step is continued after completion of said pressure qualization down to the lower desorption pressure of the bed. In the process of the embodiment illustrated in said Table I, it will be seen that only one of the four beds in the system is on the adsorption step, on a cyclic basis, at any given time in the cycle. As two pressure equalization steps are employed, i.e. said E1/PP and E2/BD and their counterparts E2 and E1, the overall cycle is referred to in the heading of the Table as a (412) E1/PP - E2/BD cycle, the 4 representing the number of beds, the 1 representing the number of beds on adsorption at any given time, and the 2 representing the number of direct pressure equalization steps, and E1/PP- E2/BD denoting the point of novelty of the invention wherein the two simultaneous processing features described above are employed in the PSA processing cycle to obtain the benefits referred to herein.

together with the E1/PP and E2/BD steps of the invention. Hence, the cycle is designated as a (522) E1/PP - E2/BD cycle in the heading of Table II below.

TABLE II

| Bed No. | Cycle (522) E1/PP - E2/BD |
|---|---|
| 1 | A \| E1/PP \| PP \| E2/BD \| P \| E2 \| E1 \| R |
| 2 | E1 \| R \| A \| E1/PP \| PP \| E2/BD \| P \| E2 |
| 3 | P  E2 E1  R \| A \| E1/PP \| PP \| E2/BD |
| 4 | E1/PP  PP  E2/BD  P  E2 E1  R \| A |
| 5 | A E1/PP  PP  E2/BD  P \| E2 \| E1 \| R \| A |

In the processing cycle illustrated in Table I, the E1/PP step is carried out, e.g. in bed 1, by the cocurrent depressurization of said bed with the void space gas released from the product end of the bed being simultaneously passed to bed 3 for pressure equalization at upper intermediate pressure and to bed 4 for the initial portion of the purge step in said bed. Following the continuing cocurrent depressurization wherein void space gas from bed 1 is passed to said bed 4 as purge gas, with bed 1 being depressurized further to an intermediate pressure level, the E2/BD step is carried out with additional void space gas being released from the product end of bed 1, which is cocurrently depressurized to a lower intermediate pressure, said gas being passed to bed 4 for pressure equalization at said lower intermediate pressure. Bed 1 is simultaneously depressurized countercurrently by the discharge of gas from the feed end thereof. The BD portion of the step is continued after completion of the E2 portion upon pressure equalization of depressurizing bed 1 and repressurizing bed 4 at said lower intermediate pressure. It will be seen from this example that the E2 step represents partial repressurization of a bed from its lower desorption pressure to lower intermediate pressure by the passage of void space gas thereto, typically directly, from a bed being cocurrently depressurized in its E2/BD step from intermediate pressure to said lower intermediate pressure by pressure equalization with said bed being partially repressurized from its lower desorption pressure to said lower intermediate pressure. Similarly, E1 represents further partial repressurization to upper intermediate pressure by the passage of void space gas thereto, typically directly, from a bed being cocurrently depressurized in its E1/PP step from upper adsorption pressure to upper intermediate pressure by pressure qualization with said bed being partially repressurized from its lower to its upper intermediate pressure.

When the invention as represented by the processing cycle of Table I is employed in a practical commercial air separation operation, each bed being operated at an upper adsorption pressure of 40 psig, a 160 second total or overall cycle time can be effectively utilized. The BSF of commercial 13X, 8×12 beaded, molecular sieve adsorbent, has 3,000 lb. of said 13X/TPD of oxygen product at 90% product purity. Recovery of oxygen product was 53%. By contrast, at the same 40 psig adsorption pressure, using commercial 5A, 8×12 beads and producing product oxygen at said 90% purity, a 4-bed Wagner cycle system required a 240 second total cycle time, with a higher BSF, i.e. lower productivity, of 6,000 lb. of said 5A/TPD of oxygen product.

In another desirable embodiment of the system, five adsorbent beds are employed with two beds on adsorption at all times. As in the previous illustrated embodiment, two pressure equalization steps are employed, In the cycle of Table II, A, E1/PP, PP, E2/BD, P, E2, E1 and R all have the same meanings as were indicated above with respect to the Table I embodiment. In the practice of said (522) E1/PPE2/BD Cycle for oxygen recovery at said 90% purity by air separation, employing an upper adsorption pressure of 40 psig and using the same commercial 13X molecular sieve adsorbent, in 8×12 beaded form, a total cycle time of 200 seconds is employed, with an BSF of about 3,800 lb. of said 13X/TPD of oxygen product. Recovery of product oxygen is 54%. By contrast at the same 40 psig adsorption pressure, using the same commercial 13X, 8×12 beads and producing product oxygen at said 90% purity, a standard 3-bed cycle as described above involves the use of a 180 second total cycle time, with a BSF of 4,000 lb. of said 13X/TPD of oxygen product. The recovery of oxygen product was only 49%.

Those skilled in the art will appreciate that various changes and modifications can be made in the details of the PSA process and system as described herein without departing from the scope of the invention as recited in the appended claims. It will also be appreciated that PSA systems necessarily incorporate various conduits, valves and other control features to accomplish the necessary switching of the adsorbent beds from one processing step to the next in appropriate sequence. The invention can readily be employed using conventional conduits and control features well known in the art. For purposes of the invention, the PSA system will comprise conduit means for passing void space gas released from the product end of a bed during cocurrent depressurization from said upper intermediate pressure simultaneously to other beds in the system, said gas being passed to one bed for pressure equalization at said upper intermediate pressure, and to another bed for providing purge gas to said bed. Commercially available control means can readily be employed for enabling the passage of void space gas from the bed being cocurrently depressurized to continue until an intermediate pressure level is reached, with the released gas being passed to the bed being purged, following termination of the passage of gas to the bed being pressure equalized at said upper intermediate pressure. Conduit means are also provided for passing additional void space gas released from the product end of the bed, upon further cocurrent depressurization thereof from said intermediate pressure to a lower intermediate pressure, to another bed in the system for pressure equalization therebetween at lower intermediate pressure and for simultaneously discharging gas from the feed end of the bed. Control means can likewise be provided for precluding the passage of gas from the bed to which gas had been passed during pressure equalization at lower intermediate pressure upon continuance of the discharge of gas from the feed end of the bed, i.e. the continued BD portion of the E2/BD step, down to said lower desorption pressure upon completion of the pressure equalization at lower intermediate pressure. It is convenient to employ an in-line check valve as said latter control means, with said check valve being adapted to prevent back-flow of gas at lower intermediate pressure into said bed being further depressurized from said lower intermediate pressure to lower desorption pressure. Those skilled in the art will appreciate that such variations or modifications of the PSA process and system of the invention can include in appropriate circumstances, the inclusion of additional pressure equalization steps or the providing of additional adsorbent beds on the adsorption step at any given time in overlapping processing sequence.

While the invention has been described above with reference to a constant pressure adsorption step in contrast to the standard 3-bed system employing an increasing pressure adsorption step without subsequent adsorption at a constant upper adsorption pressure level, it should be noted that the invention can be practiced by incorporating an increasing pressure adsorption step and the repressurization step, i.e. step R of Tables I and II, following partial repressurization of a bed by pressure equalization, i.e. steps E2 and E1 of said Tables. In such an embodiment, therefore, the repressurization to upper adsorption pressure is carried out with product effluent being simultaneously discharged from the product end of the bed. In such circumstance, it will be appreciated that increased amounts of product gas can be recovered in any given cycle time without sacrifice of the time available for regeneration of the bed, or alternatively, the constant pressure adsorption step can thus be made shorter to allow for more time for bed regeneration purposes, thereby enabling product purity and/or recovery to be enhanced. It should also be noted that said increasing pressure adsorption step can advantageously be employed, together with the E2/BD step of the invention in 3-bed PSA systems without a constant pressure adsorption step or the E1/PP step of the invention. This processing variation can also be employed in PSA systems having more than three beds. Thus, a processing sequence of E1 (depressurization from upper adsorption pressure), PP, E2/BD, P, E2 (partial repressurization ) and increasing pressure adsorption to upper adsorption pressure could be employed in the practice of this variation.

The pressure swing adsorption process and system herein disclosed and claimed can be advantageously employed to selectively adsorb at least one component of a feed gas mixture, thereby separating and purifying a desired product effluent gas. While the invention is particularly advantageous for separating and recovering oxygen as the less readily adsorbable component of air from nitrogen as the more readily adsorbable component thereof, it will be appreciated by those skilled in the art that various other separations, including the recovery of hydrogen from feed gas mixtures or even the separation and recovery of nitrogen as the product effluent from feed air is feasible depending upon the performance characteristics of the particular adsorbent employed in the PSA system and its ability to selec-. tively adsorb one component from a feed gas mixture in preference to another, less readily adsorbable component. Suitable adsorbent materials may include zeolitic molecular sieves, activated carbon, silica gel, activated alumina and the like. Zeolitic molecuar sieve adsorbents are generally desirable for said oxygen separation and recovery from air, with said 13 X adsorbent or 5A molecular sieve being standard materials that can readily be employed in the commercial practice of the prior art approaches improved as herein disclosed and claimed.

It will be understood that various operating conditions can be employed in the practice of the invention, depending upon the particular separation being carried out, the purity level desired, the adsorbent material employed, and the like. It has been found, however, particularly with respect to the separation and recovery of oxygen from air, that an upper adsorption pressure of from about 40 to about 60 PSIG, preferably about 45 to about 55 psig, is desirable. Desorption is conventionally at about atmospheric pressure, but other, higher or lower desorption pressures can also be employed in particular applications. The invention enables the overall cycle time to be desirably minimized, with cycle times of from about 140 to about 180 seconds being feasible in various embodiments, particularly in 4-bed systems, while somewhat longer times may be required in embodiments such as illustrated in Table II wherein a 5-bed system was employed with two beds in adsorption at any given time and in which an increase in recovery was obtainable as compared with the 4-bed system illustrated in Table I. In general, oxygen product recovery in air separation applications of the invention are readily obtainable within the range of from about 50% to about 60%, typically from about 53% to about 55%.

The invention will thus be seen to satisfy the desire in the art for improvements in the PSA technology as applied to various gas separation operations, such as the separation and recovery of oxygen from air. The simultaneous cycle steps of the invention thus enable increased absorbent productivity to be achieved, providing increased bed capacity, while product recovery improvements averaging about 5 to 6% can be obtained as compared with the commercial 3-bed PSA process. The processing cycles of the invention advantageously employ provide purge steps shorter in time than the time provided for the actual purge of the bed, with the overall cycle times being minimized without degradation of product effluent purity. The invention thus enhances the feasibility of applying PSA technology in practical, commercial gas separation operations in a more efficient, effective manner than was heretofore possible utilizing the PSA technology as developed heretofore in the art.

We claim:

1. In a pressure swing adsorption process for the separation and recovery of a less readily adsorbable component of a feed gas mixture in an adsorption system capable of selectively adsorbing a more readily adsorbable component from said gas mixture, the adsorption system containing at least four adsorbent beds, each of which undergoes, on a cyclic basis, a processing sequence that includes (1) adsorption at an upper adsorption pressure level with discharge of the less readily adsorbable component as product effluent from the product end of the bed, (2) cocurrent depressurization with release of void space gas from the product end of the bed and the passage of said gas to other beds in the system initially for pressure equalization and then for provide purge purposes, (3) countercurrent depressurization to lower adsorption pressure with release of said more readily adsorbable component from the feed end of the bed, (4) purge at said lower desorption pressure, (5) partial repressurization by pressure equalization with void space gas from other beds, and (6) repressurization to upper adsorption pressure, the improvement comprising:

(a) passing void space gas released from the product end of the bed during cocurrent depressurization from said upper adsorption pressure to an upper intermediate pressure to one other bed in the system being partially repressurized to said upper intermediate pressure, while simultaneously passing said void space gas to a second other bed as purge gas for said other bed at its lower desorption pressure level;

(b) discontinuing the passage of said void space gas to said partially repressurized bed upon said bed being depressurized and said partially repressurized bed reaching said upper intermediate pressure;

(c) further continuing to pass void space gas released from said bed being depressurized solely to said second other bed as purge gas, after completion of step (a), said bed being depressurized thereby being depressurized further from said upper intermediate pressure to an intermediate pressure level;

(d) passing additional void space gas released from the product end of the bed being depressurized upon further cocurrent depressurization thereof from said intermediate pressure to another bed in the system initially at a lower pressure for pressure equalization therebetween at said lower intermediate pressure, while simultaneously countercurrently depressurizing said bed by the discharge of gas from the feed end of the bed;

(e) discontinuing the passage of said void space gas to said bed initially at lower pressure upon said bed being depressurized and said bed initially at lower pressure reaching said lower intermediate pressure; and (f) further continuing to countercurrently depressurize said bed being depressurized after completion of said step (d) down to the lower desorption pressure of said bed, whereby enhanced adsorbent productivity, bed capacity and product recovery can be obtained at minimized overall cycle times without degradation of product effluent purity.

2. The process of claim 1 in which said system comprises four adsorbent beds.

3. The process of claim 1 in which said system comprises from five to seven adsorbent beds.

4. The process of claim 1 in which said feed gas mixture comprises air, said less readily adsorbable component comprises oxygen, and said more readily adsorbable component comprises nitrogen.

5. The process of claim 4 in which said system comprises four adsorbent beds.

6. The process of claim 5 in which said upper adsorption pressure is from about 40 to about 60 psig.

7. The process of claim 6 in which said upper adsorption pressure is about 45 to about 55 psig.

8. The process of claim 7 in which said overall cycle time is from about 140 to about 180 seconds.

9. The process of claim 8 in which said oxygen product recovery is from about 53% to about 55%.

10. The process of claim 5 in which oxygen product recovery is from about 50% to about 60%.

11. The process of claim 4 in which said system comprises from five to seven beds.

12. The process of claim 11 in which said upper adsorption pressure is from about 40 to about 60 psig.

13. The process of claim 12 in which said upper adsorption pressure is from about 45 to about 55 psig.

14. The process of claim 13 in which two adsorbent beds are on the adsorption step, in overlapping sequence, at any given time in the cycle, oxygen product recovery being from about 50% to about 60%.

15. The process of claim 14 in which said oxygen product recovery is from about 53% to about 55%.

16. The process of claim 11 in which said feed gas mixture comprises air, said less readily adsorbable component comprises oxygen and said more readily adsorbable component comprises nitrogen.

17. The process of claim 16 in which said system comprises four adsorbent bed, in which said upper adsorption pressure is from about 40 to about 60 psig, said product recovery is from about 50% to about 60%, and said overall cycle time is from about 140 to about 180 seconds.

18. The process of claim 16 in which said system comprises from five to seven adsorbent beds, with two beds on the adsorption step, in overlapping sequence, at any given time in the cycle, oxygen product recovery being from about 50% to about 60%.

19. The process of claim 1 in which said provide purge step (c) is of shorter duration than purge step (4).

20. The process of claim 1 in which said repressurization to upper adsorption pressure is carried out with product effluent being simultaneously discharged from the product end of the bed.

21. The process of claim 20 in which said system comprises four adsorbent beds.

22. The process of claim 20 in which said system comprises five to seven adsorbent beds.

23. The process of claim 20 in which said feed gas mixture comprises air, said less readily adsorbable component comprises oxygen, and said more readily adsorbable component comprises nitrogen.

24. The process of claim 23 in which said system comprises four beds.

25. The process of claim 23 in which said system comprises five to seven beds.

26. The process of claim 23 in which said upper adsorption pressure is from about 40 to about 60 psig.

* * * * *